(12) United States Patent
Logan et al.

(10) Patent No.: US 6,493,680 B2
(45) Date of Patent: *Dec. 10, 2002

(54) METHOD AND APPARATUS FOR PROCESSING BILLING TRANSACTIONS

(75) Inventors: James R. Logan, Parker, CO (US); David J. Gollob, Highland Ranch, CO (US); Mark B. Cohen, Aurora, CO (US); Craig G. Williams, Golden, CO (US)

(73) Assignee: CSG Systems, Inc., Englewood, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,095

(22) Filed: Feb. 19, 1998

(65) Prior Publication Data

US 2001/0009002 A1 Jul. 19, 2001

Related U.S. Application Data

(63) Continuation of application No. 08/704,840, filed on Aug. 28, 1996, now abandoned, which is a continuation of application No. 08/631,325, filed on Apr. 12, 1996, now abandoned, which is a continuation of application No. 08/581,733, filed on Dec. 29, 1995, now abandoned.

(51) Int. Cl.[7] .............................................. G06F 17/60
(52) U.S. Cl. ........................................................ 705/34
(58) Field of Search ................................... 705/1, 34, 40; 235/379

(56) References Cited

U.S. PATENT DOCUMENTS 5,761,650 A * 6/1998 Munsil et al.
5,884,284 A * 3/1999 Peters et al. .................. 705/34
6,070,150 A * 5/2000 Remington et al.

FOREIGN PATENT DOCUMENTS

EP    WO 97/24680    *  7/1997    .......... G06F/15/00

* cited by examiner

Primary Examiner—Frantzy Poinvil
Assistant Examiner—Thach H. Bui
(74) Attorney, Agent, or Firm—Mark R. Galis; Gary R. Jarosik; Michael A. Carrillo

(57) ABSTRACT

A computer system and method for processing bills for a plurality of customers of a plurality of node systems within a larger system, each customer bill having a particular billing cycle, comprises a memory for storing a plurality of customer bill records containing raw data to be processed to generate a customer bill. The system also comprises a bill production initiator for waking up periodically and initiating a billing cycle for a plurality of the customer bill records stored in the memory. At least one bill production manager generates a plurality of processing group files containing at least one of the customer bill records stored in the memory such each processing group file has an efficient size and contains customer bill records having at least one common variable. At least one bill production worker processes the customer bill records from at least one of the processing groups.

21 Claims, 7 Drawing Sheets

| FTA 1 | FTA 4 |
|---|---|
| 700 | 360 |
| FTA 2 | FTA 5 |
| 1000 | 720 |
| FTA 3 | FTA 6 |
| 360 | 1440 |

FIG. 6

METHOD AND APPARATUS FOR PROCESSING BILLING TRANSACTIONS

RELATED APPLICATIONS

This application is a continuation of application Ser. No. 08/704,840, filed Aug. 28, 1996, now abandoned, which is a continuation of application Ser. No. 08/581,733, filed on Dec. 29, 1995 now abandoned, which is a continuation of application Ser. No. 08/631,325, filed on Apr. 12, 1996, now abandoned both entitled "Method and Apparatus For Processing Billing Transactions." This application is related by subject matter to application Ser. No. 08/405,766 entitled "Method And Apparatus For Transaction Processing In A Distributed Database System," which was filed on Mar. 17, 1995 and which is co-pending, and to application Ser. No. 08/581,198 entitled Method and Apparatus for Hierarchical Control of a Distributed Processing which was filed on Dec. 29, 1995 and is co-pending.

FIELD OF THE INVENTION

The present invention relates generally to the field of batch processing and more specifically to bill generation through a batch process. The invention has particular applicability to a billing system for periodically generating bills for cable television subscribers.

BACKGROUND OF THE INVENTION

Cable television has become immensely popular over the last several decades. Due to the rapid growth and expansion of this industry, many different entities have participated in establishing local cable systems to meet the growing demand. As such, most local cable systems have different requirements, different equipment, different service options and different customer tastes. Almost no two local cable-systems are alike. Because many of the local cable systems are owned by multiple system operators (MSOs), the differences which have resulted from the outgrowth of the cable industry have made centralized control over the operations of the local operators a difficult and burdensome task.

For example, if an MSO owning four local cable systems in four different regions of the country wishes to set pricing information for a particular product, it would have to contact each of the four local cable systems, establish the pricing information, and supervise the local cable systems to ensure that the pricing information for that particular product was properly applied to the customers. Even with these procedures in place, it can be very difficult to maintain consistency in pricing and operations.

Bill production can be an even more daunting task. The reason for this is twofold. First, the sheer volume of data to be processed can be problematic. Secondly, the complexities of the interrelationships between customers, accounts and services can lead to confusion, increased processing time and the potential for errors. With each of the local systems and MSOs establishing individual pricing for products, services, and packages, the process for generating bills for each individual subscriber can become complex, time consuming and error prone. Often, the time required to process a billing cycle can be excessive. This can cause numerous negative effects on the operation of the business including delay in receiving revenue, confused or hostile customers and late bills. Moreover, since many architectures employ the same servers for database requests originating from both OLTP and batch processes, an extended billing batch can have a long term negative impact on system performance from an OLTP standpoint.

Another drawback of currently existing systems with respect to the bills that they generate is the treatment of data in a discrete fashion. For example, account data, service location data and subscriber data are not cohesively related. Various pieces of information, although logically related, are treated as separate abstractions without any relationship between such data represented in the system. Thus, in the case of an individual (e.g. a landlord with multiple rental units) having multiple accounts in different physical locations, multiple bills—one for each rental unit—would generally have to be generated for that single individual. This has obvious drawbacks including increased overall bill processing time, increased postage costs, inconvenience to the subscriber and resource (e.g. paper) waste.

Yet another problem existing in current billing applications relates to error handling. Often, during batch processing of bills, the processing of a particular bill will result in an error. Typically, current systems will respond to this event by discarding the batch, manually processing the bill causing the error or even removing that bill from the batch and then restarting the batch from the beginning. This scenario will often take place even if the batch has been nearly completed at the time that the error occurs. As is apparent to one of skill in the art, such treatment is undesirable in that system resources will be strained to complete the same batch portions multiple times.

SUMMARY OF THE INVENTION

Thus a need has arisen for a system which allows for efficient, flexible and accurate bill processing.

It is an object of the present invention to overcome the above and other disadvantages of the present systems.

It is a further object of the present invention to provide a batch processing system having minimal impact on the performance of OLTP transactions.

It is a still further object of the present invention to provide a billing system which allows for centralized control over billing operations.

It is yet another object of the present invention to provide a billing system which logically reflects relationships among the data to be processed.

It is a yet further object of the present invention to provide a system which can effectively and rapidly process large billing batches.

It is a still further object of the present invention to provide a system wherein a batch need not be restarted from the beginning in the event a single batch component fails.

According to one embodiment of the present invention, a method is provided for processing bills for a plurality of customers of a plurality of node systems within a larger system, each customer bill having a particular billing cycle. The method comprises monitoring a current time and date. All customer bill records having a billing cycle begin date and time greater than the current time and date are then gathered together and distributed into node groups based upon the node system associated with the customer. The node groups are then divided into one or more sub-node groups, wherein each customer bill distributed into each sub-node group shares at least one common variable. The sub-node groups are further divided into processing group files, wherein the number of customer bills distributed into each processing group file is predetermined. The processing group files are then processed to generate a bill for each customer bill record in the processing group file.

According to another embodiment of the present invention, a computer system for processing bills for a plurality of customers of a plurality of node systems within a larger system, each customer bill having a particular billing cycle, comprises a processor which contains a component for monitoring the current time and date. The processor also contains a component for generating a file containing customer bill records having a billing cycle begin date and time greater than the current time and date. The processor also contains one or more components for distributing the customer bills records into node groups based upon the node system associated with the customer, for dividing the node groups into one or more sub-node groups, wherein each customer bill distributed into each sub-node group shares at least one common variable, and for dividing the sub-node groups into processing groups, wherein the number of customer bills records distributed into each processing group is predetermined. The processor then processes the customer bill records from at least one of the processing groups. In one embodiment the sub-node groups are determined by a franchise tax area in which a customer is located. The processor may comprise a plurality of processors operating in parallel.

According to yet another embodiment of the present invention, a computer system for processing bills for a plurality of customers of a plurality of node systems within a larger system, each customer bill having a particular billing cycle, comprises a memory for storing a plurality of customer bill records containing raw data to be processed to generate a customer bill. The system also comprises a bill production initiator for waking up periodically and initiating a billing cycle for a plurality of the customer bill records stored in the memory. At least one bill production manager generates a plurality of processing group files containing at least one of the customer bill records stored in the memory such each processing group file has an efficient size and contains customer bill records having at least one common variable. At least one bill production worker processes the customer bill records from at least one of the processing groups. In one embodiment, the bill production initiator comprises components for monitoring a current time and date and for generating a file containing customer bill records having a billing cycle begin date and time greater than the current time and date. Also, the bill production manager may comprise components for distributing the customer bill records into processing group files based upon the node system associated with the customer. The bill production manager may also comprise a component for distributing the customer bill records into processing group files based on a geographical location of the customer, a component for distributing a predetermined number of the customer bill records into each processing group file, and a component for distributing a predetermined number of the customer bill records into each processing group file. The component for distributing the predetermined number of customer bill records may determine the predetermined number by evaluating the number of customer bill records which may be processed in a predetermined amount of time, for example, about one hour. The bill production manager may also comprise a component for distributing the customer bill records into processing group files based on a franchise tax area in which the customer is located.

BRIEF DESCRIPTION OF THE DRAWINGS

FIG. 6 depicts an example of a node system geography.

DETAILED DESCRIPTION OF THE PREFERRED EMBODIMENTS

The system and method of the present invention will now be described with respect to their preferred embodiments. It should be noted that although the following description assumes operation in a cable television environment, the invention is not necessarily limited thereto. As is well known, periodic billing of customers is a ubiquitous requirement existing in almost all businesses, especially those involving the provision of services. The teachings of the present invention may be applied in whole or in part to applications other than cable television which require that customers be billed for a variety of services and/or products that they have received.

Figure 1:
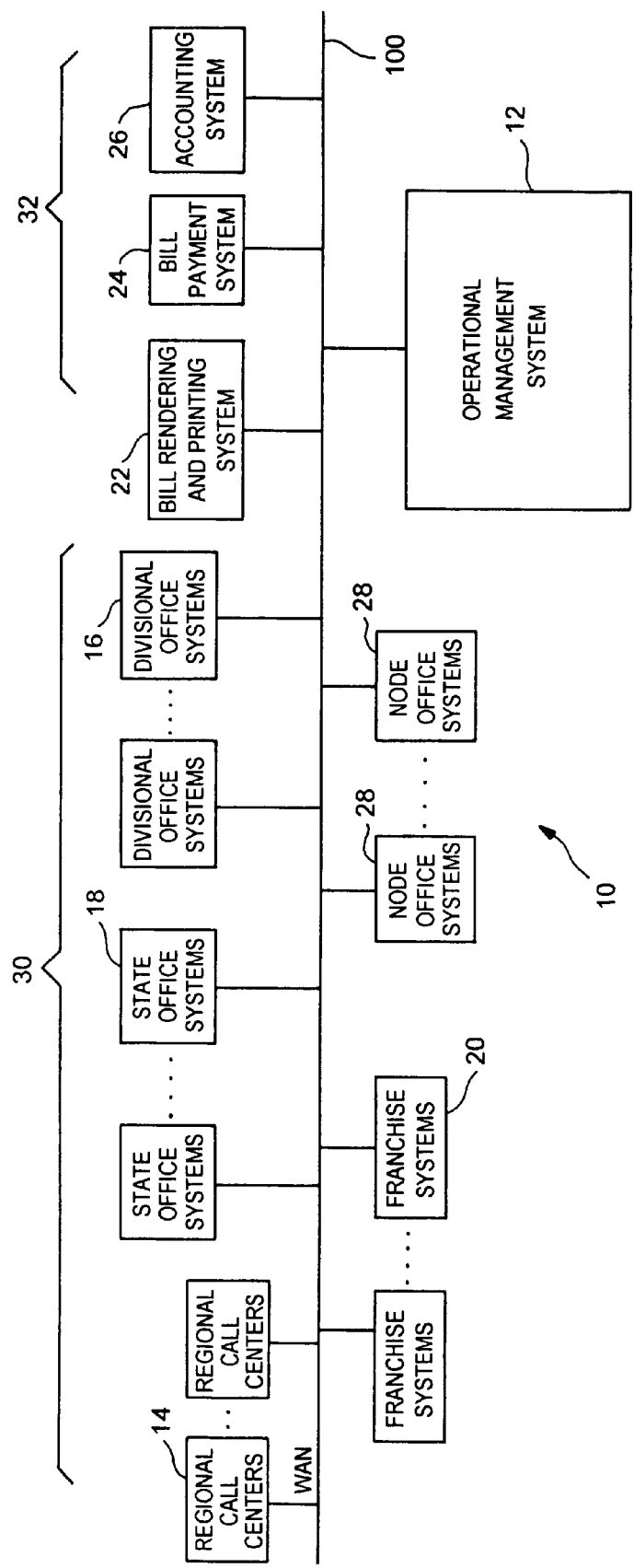
FIG. 1 depicts an overall system architecture according to one embodiment of the present invention.

In an overall system architecture according to one embodiment of the present invention is depicted in FIG. 1. System 10 in FIG. 1 comprises a operational management system 12, hierarchical systems 30, and support systems 32. Hierarchical systems 30 may comprise a plurality of divisional office systems 16, a plurality of state office systems 18, a plurality of franchise systems 20, and a plurality of node office systems 28, distributed over a wide area network (WAN) 100. Hierarchical systems 30 may also comprise one or more regional call centers 14 distributed on WAN 100.

In a preferred embodiment, each franchise system 20 may control the operations of a single cable provider or a plurality of cable providers. If a plurality of cable providers are controlled, then each franchise system 20, in this preferred embodiment may have one or more node office systems 28 associated therewith.

Support systems 32 may comprise a bill rendering and printing system 22, a bill payment system 24, and an accounting system 26 distributed on WAN 100. System 10 may also comprise additional systems distributed on WAN 100.

Figure 2:
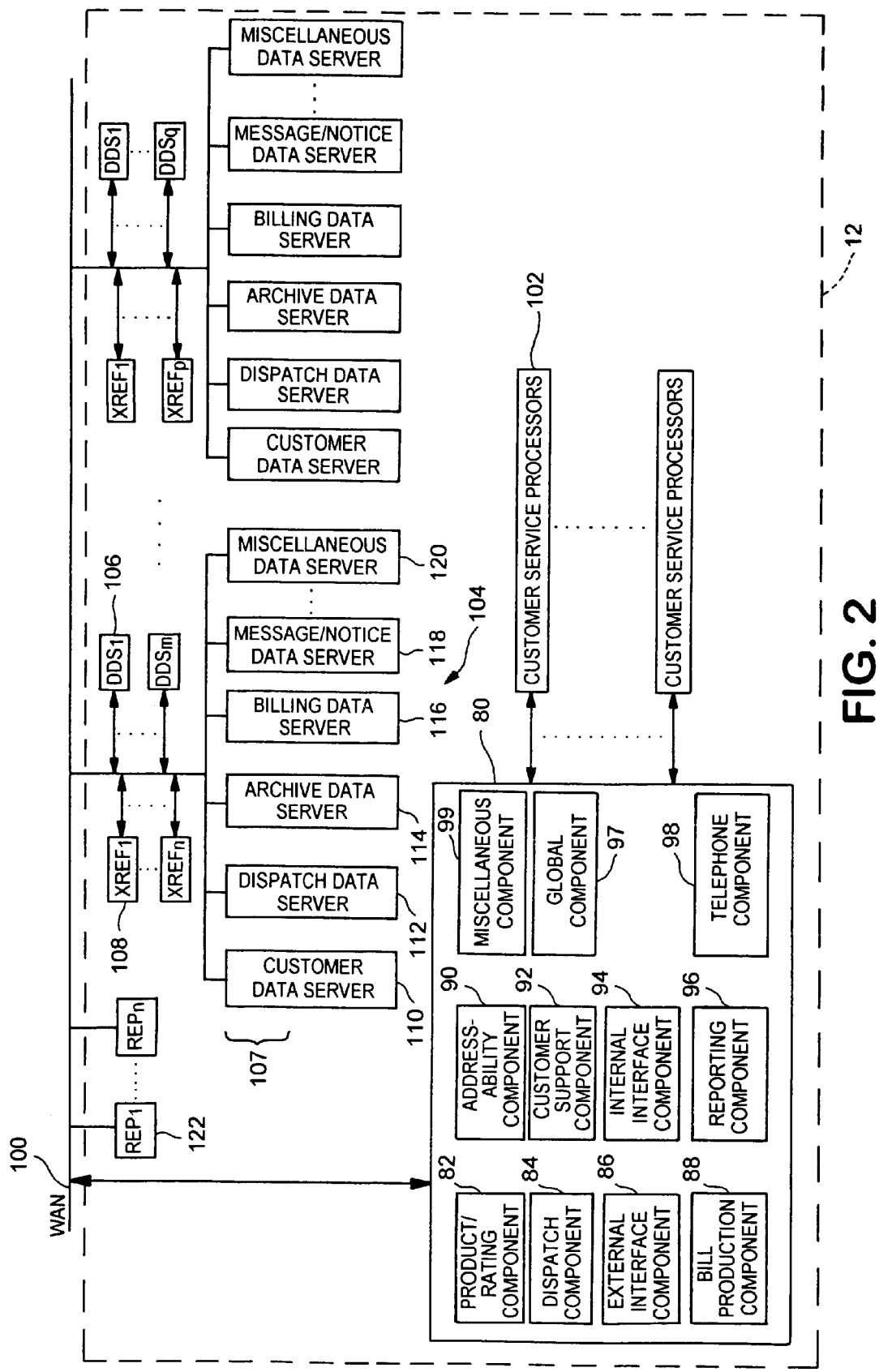
FIG. 2 depicts an operational management system according to one embodiment of the present invention.

FIG. 2 illustrates an embodiment of the operational management system (OMS) 12 of the present invention. OMS 12 generally includes operational processing system (OPS) 80, database access systems (DAS) 104, and customer service processors 102. OPS 80 comprises multiple processing components 82–99 which are responsible for various functions of OMS 12. In a preferred embodiment, the processing components comprise a product/rating component 82, a dispatch component 84, an external interface component 86, a bill production component 88, an addressability component 90, a customer support component 92, an internal interface component 94, a reporting component 96, a global component 97, a telephone component 98, and a miscellaneous component 99. The above listed components are merely exemplary. For example, multiple DAS's 104 may be employed for redundancy as discussed in further detail below (for example, two are shown in FIG. 2). Additionally, OPS 80 may be distributed physically and /or logically so that each of the processing components 82–99 may reside on a separate OPS or various individual processing components may be grouped together on associated OPSs.

As discussed above, each of the processing components may perform a variety of functions. Product/rating component 82 may be responsible for defining new products, redefining existing products, pay-per-view management, packages, promotions, installations and repair service definition, merchandise, product restrictions/blackouts, and rating maintenance, for example. The functions of product/rating component 82 are described in detail below.

The dispatch component 84 may be responsible for work order scheduling, technician quota points, work order routing, dispatch-GIS, technician maintenance, technician user interfaces, technician devices, technician communication systems, equipment inventory, outage detection, global positioning systems, map images, digitized intelligent plants, and status monitoring. Other functions may also be performed by dispatch component 84. Generally, though, dispatch component 84 processes information and requests regarding dispatch of service technicians to a customer site for repair, installation or other services.

The external interface component 86 may be responsible for collections processes, subscriber payment maintenance such as credit card interfaces, lock box interfaces, electronic funds transfer, drop box, cashiers, check-in process, and collection agencies, bill rendering, refund check rendering, and product usage payments, for example. External interface component 86 is the main component for interacting with support systems 32 and may function to communicate with other external processors as well.

The bill production component 88 is preferably the main component for interfacing with outsourcing of bill generation. Bill product component 88 may be responsible for billing cycle maintenance, bill production, reminder notices/bill messaging, refunds processing, account aging, internal collections, write-off processing, subscriber notifications, marketing inserts, bill reprints, adjustments and credits, bill formatting, cash processing-payment, and bill archiving, for example. A more detailed explanation of the operation of bill production component 88 is provided below.

The addressability component 90 is the component generally responsible for addressing customer equipment such as converter boxes. Generally, each converter box has a specific address. The addressability component 90 is responsible for sending signals to the converter box at that specific address over the WAN 100. The addressability component 90 may be responsible for channel lineups, pay-per-view connections, TAC, DMX, controller addressing, two way converter communications, digital compression, netlink functionality, automatic box refreshing, bill transmission to a converter box, payment from a converter box and converter box assignments, for example. The addressability component 90 may also be responsible for other functions.

The customer support component 92 may be responsible for various customer related functions. For example, customer support component 92 may be responsible for subscriber management, order processing, customer service, equipment inventory, customer follow-ups, on-line bulletin boards, library topics, phone directory, and tax calculations. The customer support component 92 generally comprises a plurality of OLTP applications. The operation of customer support component 92 is described in greater detail below.

The internal interface component 94 is generally responsible for various functions within the corporate structure. For example, the internal interface component 94 may comprise an accounting interface, equipment inventory, payroll/commissions, marketing interface, plant management, budget integration, and CIS functionality. Internal interface component 94 may also be responsible for other functions as well.

The reporting component 96 may be responsible for various reporting functions such as global reporting, government reporting, MSR functionality, tax returns, and ad-hoc capabilities, for example. The reporting component 96 generally functions to coordinate various data across DAS's 104.

The telephone component 98 may be responsible for various telephone oriented functions. The telephone component 98 may be responsible for automatic response unit operations, automatic number indicating screen popping processes, DNIS handling processes, call center regionalization, and phone switch interfaces, for example. Other telephone, or non-telephone related functions may also be performed by telephone component 98.

The global component 97 may be responsible for various system-wide functions such as help facilities, security, parameter management, utility programs, corporate internal information, computer-based training, audits and controls, and address maintenance. Global component 97 may also perform other functions.

A miscellaneous component 99 is preferably provided to perform other functions not performed by other components of OPS 80. For example, miscellaneous component 99 may be responsible for disaster recovery, facilities, implementation planning, architecture, GUI error handling, GUI validation processing, client hardware specifications, ad-hoc reporting tools, reporting standards, technician device UI porting, dispatch to technician communication, customer tracking, user effectiveness, system performance, system enhancement requests, client to client communications and international support. Miscellaneous component 99 may also perform other functions. Also, additional miscellaneous components 99 may be provided, if desired.

As discussed above, a plurality of customer service processors 102 are preferably connected to OPS 80. Customer service processors 102 handle requests made at OMS 12. The operations of customer service processors 102 are described in greater detail below.

OMS 12 further comprises a plurality of database access systems 104. One of the features of the present invention is that all global data is preferably maintained within OMS 12 in database access systems 104. As such, every component on the system may have access to information about any other component on system 10. For example, any node office system 28 may have access to information about any customer of any other node office system 28 in part because that information is resident on the database access system 104 which services both node office systems 28. Because data is stored globally within OMS 12, all data is accessed by global parameters also. The uniformity of data access also allows for any node office system 28 to access any other node office system 28's data because the parameters have been globally defined. Data definition is described in greater detail below.

For purposes of ensuring identity of data on the various database access systems 104, replication servers 122 may be provided. Replication servers 122 ensure that every update of data on one of the database access systems 104 also occurs to the data on the other database access systems 104.

Database Access System 104 Operations

Each database access system 104 comprises a plurality of data directory servers 106, a plurality of cross reference servers 108, and a plurality of data servers 107. For example, each database access system 104 may comprise a customer data server 110, a dispatch data server 112, an archive data server 114, a billing data server 116, a message/notice data server 118, and a miscellaneous data server 120. Database access system 104 may comprise more or fewer data servers as needed or desired.

Each processor, subprocessor, and component on WAN 100 acts as a transaction generator toward database access systems 104. These include support systems 32, bill renderer 22, bill payment system 24, accounting system 26, regional call center processors 43, customer service processors 45, main divisional processors 40, product/rating subprocessors 41, customer service processors 42, node processor 40, technician control subprocessor 52, administration subprocessor 54, customer service processors 56, head end controller 62, OPS 80, product/rating component 82, dispatch component 84, external interface sub-processor 86, bill production coexternal component 88, addressability component 90, customer support component 92, internal interface component 94, reporting component 96, global component 97, telephone component 98, miscellaneous component 99, and customer service processors 102. Each of these elements may make a data request over WAN 100. All data requests in a preferred embodiment are handled by one of the DAS's 104.

Each of these transaction generators is connected via WAN 100 which is a two-way communication link to the one (or more) DAS's 104. As described above, each DAS 104 may include any number of data directory servers 106, but includes at least one. Each data directory server 106 in turn is connected via a two-way communication link to multiple data servers 107, for example. Each data server 107 comprises one or more databases either as components of a single subsystem (processor and database) or through a two way communication link. Additionally, each DDS 106 is connected via a two-way communication link to one or more cross reference servers (X-ref$_1$-X-ref$_n$, where n=any integer) 108.

In FIG. 2, DDSs 106 are represented as being connected over WAN 100. Likewise. DDSs 106 are represented as being connected to a plurality of data servers 107. In a preferred embodiment, these connections are individual connections rather than connections to a grouping of DDSs 106. For example, OPS 80 is separately connected to each DDS 106. Further, each customer data server 110 is separately connected to each DDS 106. Alternatively, however, DDS functionally may be grouped with common connections to the transaction generators and/or data servers 107 as indicated in FIG. 2, so long as proper control between DDSs 106 is maintained.

The system of the present invention is designed to manage a very large number of OLTP transactions occurring within the system. The system of the present invention provides users with the ability to query across the entire database from any element in the system. Similarly, each of the users may update certain data located anywhere within the system.

DDSs 106 respond to transaction generators through procedure calls to the DDS. The transaction generators in the system of the present invention may be any devices capable of receiving input from a user and transmitting that input to the Data Directory Servers (DDSs) 106. In a preferred embodiment, each of the components of the hierarchical control systems 30 comprise transaction generators. At least one control application is resident on each transaction generator, wherever located, for communication between the DDS(s) 106 and a human operator and/or process. As will be discussed in more detail below, the control application, among other functionality, enables updating the internal rules used by DDS(s) 106.

As described in more detail below, when a transaction is generated by a transaction generator and sent to a data directory server 106, data directory server 106 determines the appropriate data server 107 for execution of the transaction. Preferably, this is accomplished by DDS 106 consulting the internal rules and identifying the arguments associated with the transaction.

Each of the transaction generators are clients of the DDSs 106. These terms are used interchangeably herein. Transaction generators may be dumb terminals (i.e.. incapable of performing local processing) or they may have various processing capabilities of their own. Examples of transaction generators include, without limitation, PC's, RISC-based workstations, supercomputers, and local area networks. In typical applications, there may be a large number of transaction generators. Thus, the system is designed as an open platform environment which is hardware independent. The transaction generators may be homogeneous in terms of interface and operation or they may be heterogeneous. In other words, all transaction generators may be of one type or there may be a variety of devices interacting with the DDSs 106. It is also possible to permit customer interaction with the system through ARU/ANI (Automated Interactive Voice Response Unit/Automatic Number Indicator) units such as ARU 70, and telephone component 98. In this case, much of the processing may be driven by the telephone number retrieved by the ANI when the customer calls into the system.

DDSs 106 of the present invention function as the middle tier of a three tier client/server architecture. As depicted in FIG. 2, more than one DDS 106 may exist within the operational management system 12. In such case, each DDS 106 has communication access to all of other DDSs 106 as well as to each data servers 107. DDS 106 serve three primary functions. After receiving a client request, the selected DDS 106 first locates the appropriate data server 107 for execution of the request. It then submits the client request to the selected data server 107 and finally DDS 106 returns the result to the submitting client.

Transaction generators requesting information from the databases connect to a DDS 106 prior to accessing data. Through the use of internal rules. DDS 106 determines where a remote procedure should be performed in order to complete processing of a transaction. Access to DDS 106 may be efficiently implemented through the use of remote procedure calls (RPCs) which are identified in tables internal to DDS 106. Any of a large number of standards for such RPCs may be used with the current invention.

DDS(s) 106 are preferably open server applications that provides a mechanism to direct any data request associated with a generated transaction to a data server 107 that can service the transaction generators' requests. Specifically. DDSs 106 may be open servers comprising the same or similar hardware as data servers 107 of the present invention. Alternatively, DDS 106 may be configured differently from the data servers 107. DDS 106 function to analyze the client's data request transaction and, based upon the transaction type and a set of rules, directs the request to the appropriate data server 107. The types of transactions which are received at DDSs 106 are based upon a set of stored procedures recognizable to DDSs 106 and available to the transaction generators.

DDSs 106 communicate with a plurality of data servers 107 each accessing one or more storage devices. In a preferred embodiment of this invention the data servers 107 are Sybase SQL Servers which execute Sybase remote procedure calls. This invention is not, however, necessarily limited thereto and the servers may be of any type so long as the stored procedures are designed for processing by the particular server and the associated database which are selected. It is possible to employ any number of data servers 107, transaction generators, and DDSs 106 in the operational management system 12 of this invention so long as the proper number of communication channels is supplied and supported.

As noted above, more than one DDS 106 may exist in the system to provide scalable execution of these functions, each such DDS 106 being in communication with all transaction generators/clients and all servers 107. In an embodiment with multiple DDSs 106, the clients are connected with one DDS 106 according to a pre-determined method.

DDSs 106 preferably operate according to a limited number of event handlers responsible for processing the requests generated by the transaction generators 120 as well as internal requests generated as a result of DDS processing itself. The event handlers are as follows:

1. Start Handler—The start handler provides a convenient and central location for installing any other event handler routines, building any tables necessary for processing client requests and for installing any other services that the DDS requires for its functionality.
2. Stop Handler—The stop handler is executed when a request to shut down the system has been received through a particular request or as a result of certain system conditions.
3. Connect Handler—The connect handler is executed whenever a client connects to the DDS.
4. Disconnect Handler—The disconnect handler is executed whenever a client terminates an active connection to the DDS.
5. Language Handler—The language handler is executed whenever a client application issues a language statement to the DDS. The language handler in the DDS does nothing since all client requests are required to be either registered procedure calls or remote procedure calls.
6. RPC Handler—The Remote Procedure Call handler carries the bulk of the load shouldered by the DDS and is the most important handler for purposes of this discussion. Any client request which is not registered in the DDS registered procedure table will generate an RPC handler event where the request is analyzed by the RPC event handler and acted upon accordingly.
7. Error Handlers—Several error handlers are installed in the DDS application to provide information on any failure from the client, server and client/server components of the DDS. All error messages are logged in the DDS.
8. Attention Handlers—An attention handler is installed to handle disconnects from a client application. The DDS has been set up to cause all client disconnects to generate an attention event in order to determine if the client application has interrupted its connection to the DDS.

The functionality comprising the operation of the DDS can be categorized into three separate classes—the main function, the local DDS registered procedures and the utility functions. The main ( ) function provides the entry point for all executable C programs. Note that although the preferred embodiment is formulated using the C and C++ languages, the particular invention described herein is by no means limited to such a design. The error handlers and the start handler are installed in the main function body. These include a set of routines which serve to parse input parameters and configuration file attributes in order to set up any DDS properties. The network listening function is spawned in the main function body and sleeps until the DDS application is terminated either normally or abnormally.

The DDS application is dependent on several global data tables. These global tables are used to control the navigational decisions that the RPC Handler needs to direct the client's data requests to the appropriate data server in order to complete the data request.

Service requests originating at the client that are not identified as a registered procedure, are treated as remote procedure calls and are handled by the RPC Handler. All of the event handlers and supporting system functions provide a trace log of activities in a locally maintained log file. This file is preferably truncated every time the DDS application is started.

Data servers 107 maintain the various data necessary for meeting the functions described above and are accessible by each of the transaction generators through a DDS 106. In a typical implementation, data servers 107 are SQL devices which are capable of executing the RPCs transmitted by a DDS 106.

The databases available to data servers 107 may be either homogenous or heterogeneous. In a homogeneous environment, particular protocols for accessing each of the databases are consistent throughout the enterprise. Conversely, in a heterogeneous environment, the particulars of database access vary within the enterprise. In a heterogeneous environment, it is often desirable, however, to render any differences in requirements within the enterprise transparent to user working at the client site. That is, a user should not be aware of any database heterogeneity and a user request should be processed in a standard manner across all resources.

The databases which are accessed in a distributed system may all be located together or they may be physically apart. They may be at the client location or they may be at an alternate site. Databases may be relational databases such as Sybase (a trademark of Sybase, Inc.) or they may be as simple as a series of flat files.

DDSs 106 interface with a control application which resides on each transaction generator. The control application functions to allow a system operator to store, update, and modify stored procedures available to the transaction generators. This is typically accomplished by downloading the update to the X-Ref Server 108 which loads the new rules base into the DDSs 106 at DDS startup.

OPS 80 also includes one or more X-Ref Servers 108. X-Ref Servers 108 function as a resource available to DDSs 106 for determining where specific data resides in the system and for storing the rules base which is loaded into DDSs 106 at DDS startup. X-Ref Servers 108 contain a variety of global tables which are continually updated as data is added, updated and deleted within the system.

In a preferred embodiment. DDSs 106 access XRef Server (s) 108 at startup to access database information necessary for the operation of DDSs 106. After the startup tasks are complete, normal client requests may be processed by DDSs 106. Alternatively, DDSs 106 may access XRef Server(s) 108 (or any other device containing the required data) as requests are submitted to DDSs 106.

Client requests are initiated at the transaction generators and transmitted to a DDS 106. Once it has received the data request, the DDS application consults the DDS Server Table (a global table) which identifies all of the available and accessible data servers 107. There is also provided an XRef Server Table (global) which identifies all known and accessible XRef Servers 108. An additional global table is the Error Message Handler Table which maintains all error handler messages. All of the global tables defined in DDS 106 provide feature functionality to support the access related to these tables.

The transaction generators make requests for reads, writes, and updates through DDS 106. As discussed above, once a request is received, DDS 106 determines the set of potential data servers which may execute the request and pseudo randomly selects one or more servers from that set for servicing. Alternatively, various, non-random and semi-random methods for selecting the subset of potential data servers may be used. Examples of such methods include those relating to current server loads (load balancing) and those relating to queuing theory in general. The subset of servers which are available to process the request may be determined in one of two ways as discussed above. In a first embodiment, global tables are loaded from XRef Server 108 into internal DDS memory at DDS startup. In a second embodiment, no such loading occurs at startup—rather, upon receiving a client request, DDS 106 submits a request to XRef Server 108 in order to retrieve the necessary data. In either embodiment, DDS 106 has available to it the necessary rules base and other data which is required to determine the type of transaction (including the data required and the locations of that data) and to select the appropriate data server(s) 107 for processing the transaction. Next, the request is submitted to the selected data server(s) which process the request and returns a result set to DDS 106 which may then perform additional operation(s) on the data prior to passing the final result set back to the transaction generators. Alternatively, the result set may pass through DDS 106 to the transaction generators without any additional processing on the part of DDS 106. The latter situation is generally termed "pass-through mode".

After a request has been serviced and the result set has been returned to the transaction generators, DDS 106 may receive another request and process it in accordance with the above procedure. In such an embodiment, the DDS 106 does not begin processing a new request until it has completed processing of the prior request. In another and preferred embodiment, a single DDS 106 processes multiple client requests concurrently exploiting the availability of numerous resources for processing large numbers of transactions.

The operations of DASs 104 according to one embodiment of the present invention are described in greater detail in application Ser. No. 08/405,766 entitled "Method And Apparatus For Transaction Processing In A Distributed Database System," which was filed on Mar. 17, 1995, which is co-pending and which is hereby incorporated by reference.

Figure 3:
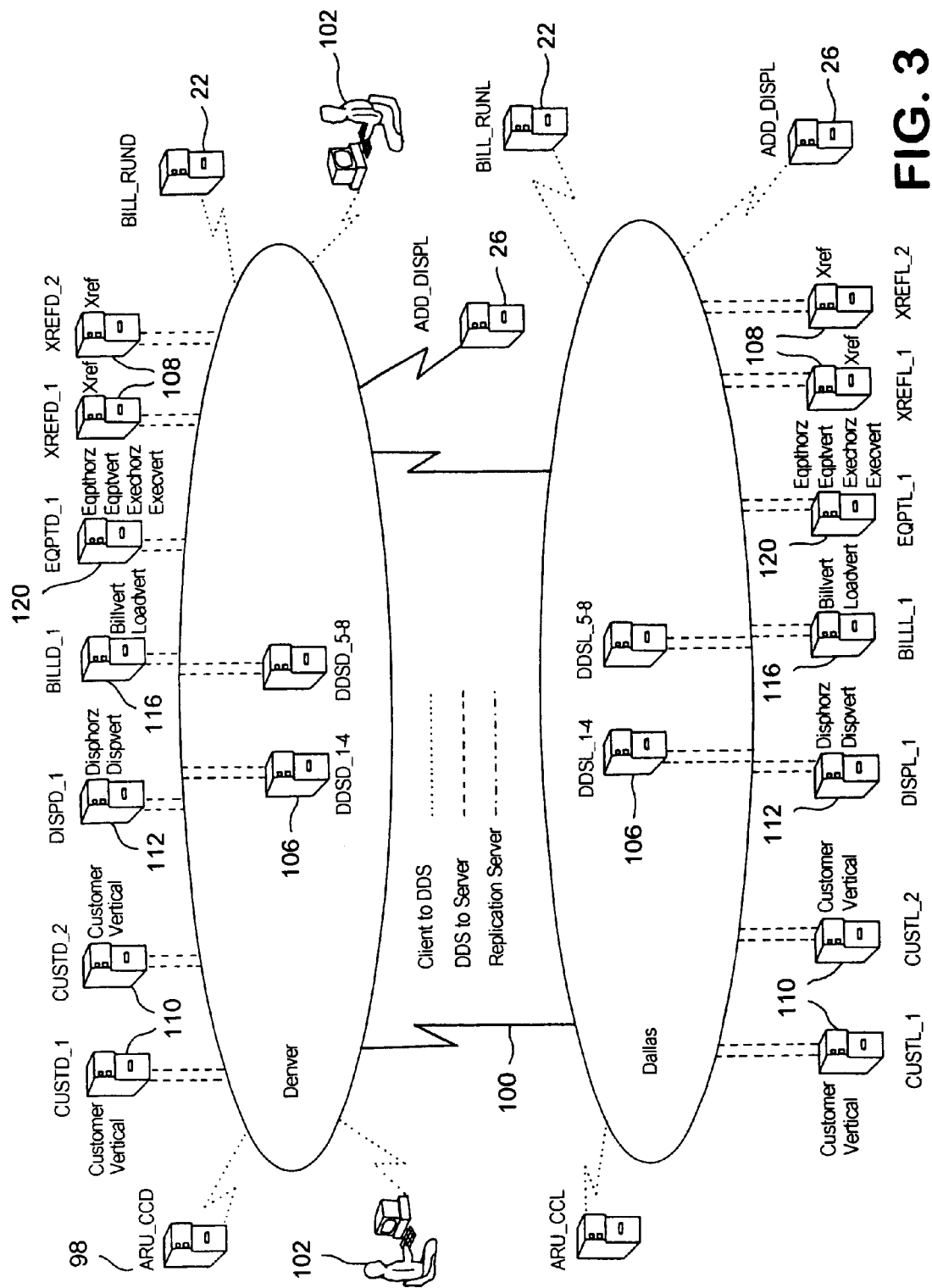
FIG. 3 depicts an operational management system according to one embodiment of the overall system architecture of FIG. 1.

FIG. 3 depicts another configuration illustrating the connections of the various components of DAS 104. In this embodiment, two DAS's 104 are provided, one at Denver, for example, and one at Dallas, for example. The DAS's 104 are distributed over WAN 100. Customer service processors 102 are also indirectly connected to WAN 100 to enable access to DDS's 106, XRef servers 108 and the various data servers 107 which in this embodiment may comprise customer data server 110, dispatch data server 112, bill data server 116 and miscellaneous data server 120. Several of the external processors 32 may also be connected to WAN 100. For example, bill printing system 22 and accounting system 26 may be provided with access to DDSs 106.

In the embodiment of FIG. 3, there are eight DDSs 106 provided at each location and two XRef servers 108. These numbers may be varied such that more or fewer DDSs 106 may be provided or more or fewer XRef servers 108 may be provided.

Three types of connections may be provided:
1) a client to DDS connection;
2) a DDS to data server connection; and
3) a replication server to data server connection.

In FIG. 3, the various connections are depicted. As described above, in a preferred embodiment, each of the components are directly connected. For example, each customer service processor 102 is preferably directly connected to a DDS 106. Also, each data server 107 is preferably connected directly to a DDS. A replication server is a server that generates a duplicate copy of the information located on a primary server.

In a preferred embodiment, when at least two DAS's 104 are provided, each DAS 104 has an associated replication server 107. For example, in FIG. 3, CUSTD_2 may have the same information as CUSTL_2. In this embodiment, if a customer service processor 102 requests information from DDSD_1, for example, about a customer which is stored on CUSTD_2 and the DDSD_1 is unable to access that data server (for whatever reason, e.g., transmission problems), the DDSD_1 may access the required data from CUSTL_2 in Dallas. Therefore, the CUSTL_2 is a replication server for DDSD_1 and all other DDS's at the Denver location.

With the above description of the OMS 12 and specifically the DAS 104 in mind, the method for processing bills according to the present invention is now described. As described above, the billing system of the present invention has ultimate responsibility for insuring that all valid transactions that should appear on a subscriber's statement are gathered, priced, taxed and prepared for further processing by an external bill rendering system. The final product generated by the billing component 88 of OMS 12 is data representing generated bills in the form necessary for cursory processing and printing by bill renderer 22. The information available to bill renderer 22, once processing by billing component 88 is complete, includes all billing detail as well as appropriate bill format fields. Additionally, billing component 88 insures that appropriate subscriber messages and notices are applied to statements.

Because of this architecture, system 10 may provide bill production component 88 with centralized control over billing operations for every node system 28 on system 10. Further because all data about every customer and product on system 10 is located in DAS 104, bill production component 88 may access relationships amongst the customers, accounts and bills stored in DAS 104 to generate a single bill for a customer having multiple account and/or multiple service locations. Also, by centralizing the bill operation, a single large scale processing system may be economically feasible and thus the present system provides for large batch billing using such a system.

Bill Production Processes

Figure 4:
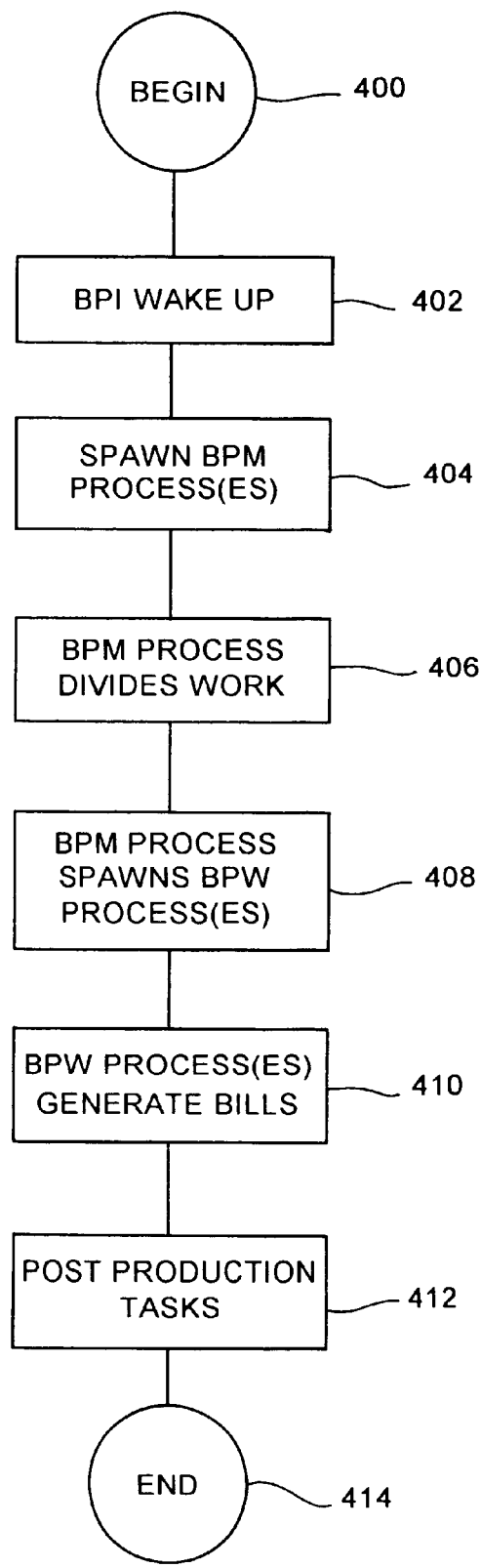
FIG. 4 depicts a flow chart of an overall process according to one embodiment of the present invention.
Figure 5:
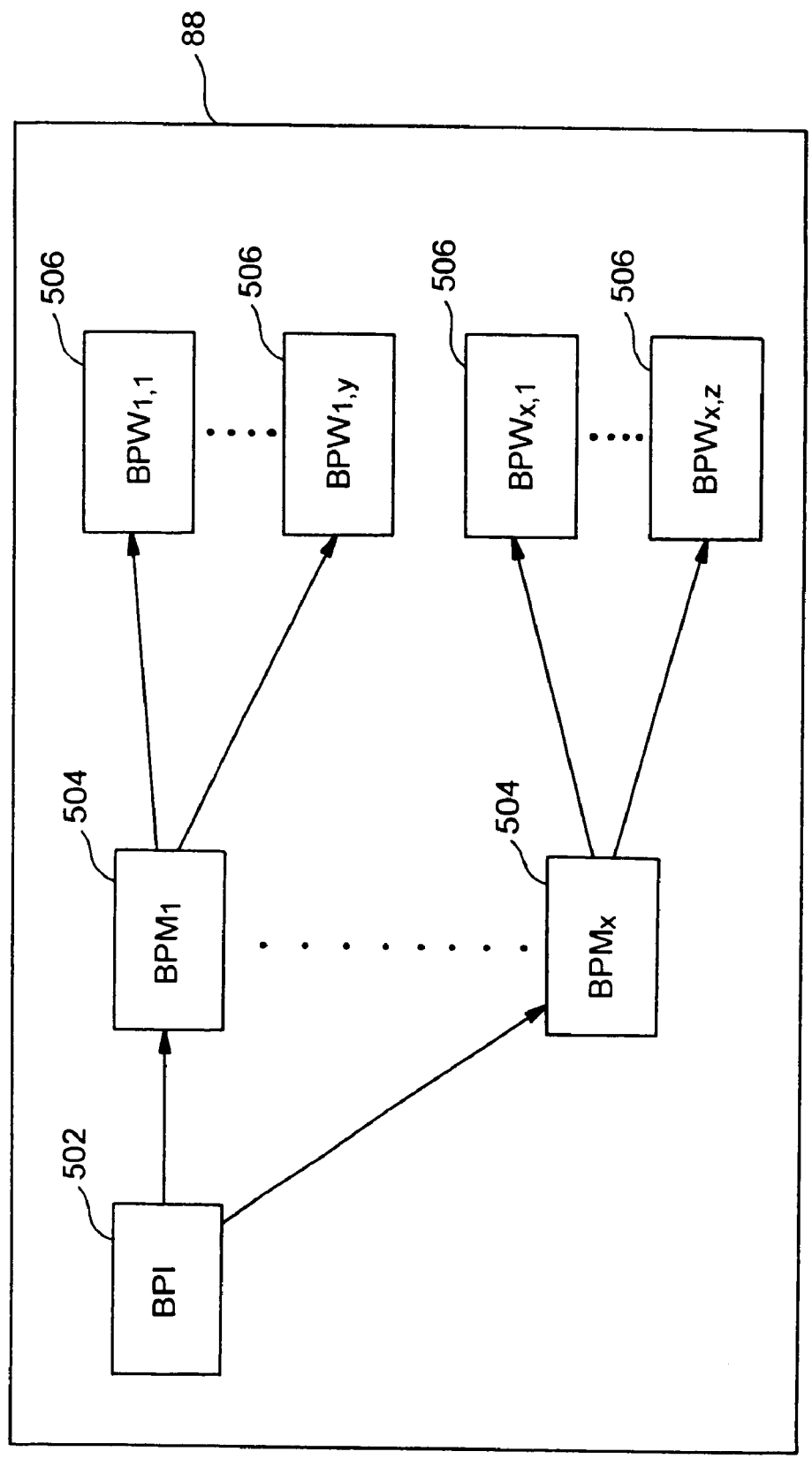
FIG. 5 depicts a bill production component according to one embodiment of the present invention.

Bill production component 88 completes a bill batch according to three distinct subprocesses. FIG. 4 is a flowchart generally describing the broad steps in bill production according to the present invention. FIG. 5 is a schematic diagram of the bill production component 88 and the various sub components contained in that component. When bill production is to begin (step 400), a Bill Production Initiator (BPI) 502 is awakened (step 402). BPI 502 serves the general function of waking up periodically and initiating a billing cycle. In broad terms, BPI 502 is responsible for monitoring the current time and date so that it may determine when certain customer bills need to be processed.

BPI 502 selects the billing work within the OMS 12 that needs to be processed for the specified billing cycle and then spawns one or more Bill Production Manager(s) (BPMs)

504 (step 404). Multiple BPMs 504 may be operable at any one time. BPI 502 is thus responsible for gathering customer bills having a billing cycle begin date and time greater than the current time and date and spawning one or more BPMs to handle those customer bills.

Each BPM 504 is responsible for dividing up the work it is to process (step 406). In a preferred embodiment, each BPM 504 preferably corresponds to a particular billing run for a particular business unit. For example, a BPM 504 may be created for a billing run on the 15th of the month (billing cycle) for one particular node office (cable operator). Each BPM 504 processes the billing work specified by BPI 502 in order to divide the work up into manageable units. Work is further divided by the BPM 504 such that the most efficient overall processing takes place. In general, BPM 504, in one embodiment, is responsible for distributing the customer bills into node groups based upon the node system associated with the customer, dividing the node groups into one or more sub-node groups, wherein each customer bill distributed into each sub-node group shares at least one common variable, and dividing the sub-node groups into processing groups, wherein the number of customer bills distributed into each processing group is predetermined as discussed below.

Finally, the last major sub-component in bill production component 88 is the Bill Production Worker (BPW) 506. Each BPM 504 may spawn one or more BPW 506 processes (step 408). Multiple BPW processes 506 preferably are running at a single time such that each of the processing group files specified by BPM 504 may be processed by a BPW 506 process. Further, multiple BPW processes 506 allow for parallel processing of the bill production workload. The ultimate result of the BPWs 506 (and the billing component 88 in general) is the generation of individual bills for customers (step 410). In other words, BPW 506 is responsible for processing the bills from each processing group.

Upon completion of the BPW 506 processes, various post production activities may occur (step 412). These activities may occur as part of the BPW process itself, requiring completion prior to BPW processing being considered completed. Alternatively, the post production activities may be separately processed following BPW processing but prior to actual bill rendering. In a preferred embodiment, the post production activities occur automatically as part of the bill production processing, however, post production activities may alternately be manually instituted upon certain events such as the completion of a BPW process.

Post production activities may include, for example, storing a copy of a bill image as generated by each BPW 506 in the database for later access by a CSR on-screen in case a customer wishes to discuss an old or newly generated bill. Thus an archive database of customer bills is maintained within the system for some period of time so that images may be called up wherein the images will match the hard copies generated and mailed by the bill renderer. Another post production activity may be further steps in preparing the bill run for transmission to a bill renderer. For example, a header file may be created indicating such things as the number of bills following the header for the particular run, special fonts that will need to be accessed during printing of the subsequent bills, inserts that need to be included during preparation of the subsequent bills or special images that will need to be accessed during the printing of the subsequent bills. Upon completion of the post production tasks, bill production component 88 ends (step 414).

It is important to realize that bill production component 88 must necessarily interface with other components of operational management system 12 in performing the bill generation process. For example, bill production component 88 must interface with addressability component 90, for example when bill production component 88 determines that an account is past due during the aging process. In this case bill production component 88 causes addressability component 90 to place, for example, a pay-per-view inhibit flag on the subscriber's account and converter box. Similarly, and as is apparent to one of skill in the art, bill production component 88 interfaces with bill rendering system 22 such that bill production component 88 supplies all data necessary for bill rendering system 290 to print bills suitable for delivery to subscribers. Each of the three major processes is now described in detail.

The Bill Production Initiator (BPI)

BPI 502 process is started at regularly scheduled intervals which are preferably specified by a systems administrator. The BPI 502 is responsible for building the records which the other two processes may use to drive actual bill production. Only one bill production cycle may preferably be active within the OMS 12 at one time. Therefore, BPI 502 preferably does not submit a new bill production run if an existing cycle is in progress.

BPI 502 selects billing cycles for processing within the current bill production run. More specifically, it collects cycles whose cycle bill production day matches the current bill production day. In a preferred embodiment, the current bill production day is the current calendar day. BPI 502 identifies all cycles to process for a particular production run. When a bill production process begins, one of BPI 502's primary responsibilities is to identify all cycles, across all business units, that should be processed. A cycle is identified through a combination of its bill production day and an associated business unit (in a preferred embodiment a node system 28). Each billing cycle is assigned to a single bill production day. Node systems 28 may have up to a maximum of 28 monthly billing cycles. In a preferred embodiment each node system 28 operating under the control of OMS 12 has either 1, 2 or 28 billing cycles associated with it. There is a unique bill production day associated with each monthly billing cycle. The use of a single bill production day per billing cycle enables OMS 12 to ensure that all subscriber billable transactions are processed when monthly cycles are selected during the bill production process.

As an example, a cable television system in New Jersey may have four monthly billing cycles, one of which has a bill production date falling on the 15th of every month. Therefore, on Feb. 15, 1995, for example, the billing cycle for the New Jersey system would be selected by the BPI 502. In addition, all other cycles that have a bill production day equal to the 15th of the month would be selected for processing during this bill production run. In the event that BPI 502 fails or aborts, the selected accounts are preferably deselected and the bill production component 88 is restarted with no billing cycles yet selected for processing.

As discussed above, BPI 502 evaluates bill cycle maintenance information to identify all billing cycles and node systems 28 (or franchises) that are to be processed during the current billing production run. In order to perform this task, BPI 502 identifies the last date and time that bill production was accomplished (LASTRUN). This date is then compared to the date and time that the current bill production run was established (CURRUN). If LASTRUN=CURRUN or if a bill production run is currently in progress, BPI 502 immediately terminates. Otherwise, if LASTRUN is before CURRUN and there are no bill production runs in progress, BPI 502 extracts the day and time from the LASTRUN data and records the CURRUN date and time. The extracted LASTRUN date and time is employed to identify all cable systems and cycles that have a bill production day/time that is later than the LASTRUN date and time but before the CURRUN date and time. When a cycle is identified, the Bill Cycle Maintenance information is updated with the CURRUN date and time.

BPI 502 also identifies a Bill Production Bill-Through Date (BPBT Date) for the bill production run for each individual business unit and for each cycle selected for bill production. The BPBT Date is used when the BPW calculates account subscription charges for each individual customer. In order to determine the BPBT Date, the bill cycle maintenance information is evaluated to determine an Effective Anniversary Date (EAD). If an EAD is not defined, the node system 28 is assumed to use anniversary billing. In this case, the last day in the anniversary date range is identified as is the current month and year. One month is then added to this identified date resulting in a BPBT Date to be associated with the selected business unit and cycle.

If an EAD is defined, the node system 28 is assumed to split its cycles by franchise or zip code. In this case, the EAD and the current month and year are identified and one month is added. The resulting date is the BPBT Date for the selected business unit and cycle. An example of BPI 502 operation and specifically the method by which it selects bill cycles to run is now provided.

Assume the following Bill Cycle Maintenance Information

SYSTEM A

| Cycle | Prod Date/Time | January Prod Date/Time | February Prod Date/Time |
|---|---|---|---|
| 1 | 10/9 pm | 1/10/95 @ 11:01 pm | |
| 2 | 20/9 pm | 1/20/95 @ 11:30 pm | |
| 3 | 30/9 pm | 1/31/95 @ 12:10 am | |

SYSTEM B

| Cycle | Prod Date/Time | January Prod Date/Time | February Prod Date/Time |
|---|---|---|---|
| 1 | 4/10 pm | 1/4/95 @ 10:30 pm | 2/4/95 @ 10:01 pm |
| 2 | 10/11 pm | 1/11/95 @ 12:30 am | |
| 3 | 21/11 pm | 1/21/95 @ 11:01 pm | |
| 4 | 28/11 pm | 1/28/95 @ 11:45 pm | |

Assume:
  Last Bill Production Date/Time=Feb. 9, 1995@11 pm
  In Progress Bill Production Date/Time=Feb. 10, 1995@11:30pm If bill production was initiated at 11:30pm on February 10, the process operates to first compare the Last Bill Production Date/Time to the In Progress Bill Production Date/Time. In this case the Last Run is earlier than the In Progress Run so the day and time are extracted from the Last Bill Production Date/Time (9 and 11pm). The Last Bill Production Date/Time is then updated to reflect the time that the current bill production run was initiated (Feb. 10, 1995@11:30 pm) and the extracted values are used to identify all systems and cycles that have a production day and time later than the extracted values but earlier than the day and time of the current bill run initiation. In this example the systems and cycles selected would be System A, cycle 1 and System B, cycle 2. As each system is selected, the date that bill production is initiated is recorded in the Bill Cycle Maintenance Information. The results of the update for this example are shown below.

Bill Cycle Maintenance Information

SYSTEM A

| Cycle | Prod Date/Time | January Prod Date/Time | February Prod Date/Time |
|---|---|---|---|
| 1 | 10/9 pm | 1/10/95 @ 11:01 pm | 2/10/95 @ 11:30 pm |
| 2 | 20/9 pm | 1/20/95 @ 11:30 pm | |
| 3 | 30/9 pm | 1/31/95 @ 12:10 am | |

SYSTEM B

| Cycle | Prod Date/Time | January Prod Date/Time | February Prod Date/Time |
|---|---|---|---|
| 1 | 4/10 pm | 1/4/95 @ 10:30 pm | 2/4/95 @ 10:01 pm |
| 2 | 10/11 pm | 1/11/95 @ 12:30 am | 2/10/95 @ 11:30 pm |
| 3 | 21/11 pm | 1/21/95 @ 11:01 pm | |
| 4 | 28/11 pm | 1/28/95 @ 11:45 pm | |

Last Bill Production Date/Time=Feb. 10, 1995@11:30pm
Billing Production Manager (BPM)

When BPI 502 wakes up and determines which bills are to be run, it initiates a BPM 504 for each of the node systems 28 for which bills are to be run. In a preferred embodiment, each node system has a BPM 504 associated with it for every billing cycle. For example, a BPM 504 may be created for a billing run on the 15th of the month (billing cycle) for one particular node office (cable operator). If system 10 had one node system for Greeley, Colorado and another for Denver, Colo., each having the same billing cycle, BPI 502 would spawn a BPM 504 for the Greeley node system and another BPM 504 for the Denver node system.

Each BPM 504 is responsible for dividing up the work it is to process (step 406). Work may also be further divided by the BPM 504 such that the most efficient overall processing takes place. In a preferred embodiment, the BPM 504 first divides the bills to be processed based on a franchise tax area. A franchise tax area is defined based on commonality of taxation within the area. Cable node systems are often distributed across various municipalities and other boundaried regions. For example, one cable node may span several counties, several towns within those counties and several townships within those towns. Each of those various regions may have a different taxation base. A cable customer in a city may be subjected to both county and city taxes, whereas a cable customer in the county may be subjected only to a county tax. For ease of processing. BPM 504 preferably uses regions having common taxation structures to divide the bills to be processed. By dividing bills into a franchise tax area (FTA). the system achieves the benefit of common sets of products and common taxes. Therefore, the processing to be performed on those bills is essentially the same.

Another incidental benefit of dividing bills in this manner is that franchise tax areas almost always have a common zip code according to the postal system. Therefore, for any particular bill grouping divided by the BPM 504 and eventually processed by the BPW 506 and passed to a bill renderer, all of the bills to be mailed out for that grouping will be directed to a single zip code. Under the current postal system, such large bulk mailings to a single zip code may qualify for a discount. Further, the FTA may correspond to a postal route number (the four digit code affixed to the five digit zip code). By dividing bills into postal route number as well (the postal route often corresponds to a neighborhood), even further postal service discount rates may be achieved.

Beyond this division, BPM 504 may further divide the bills based upon the amount of time that the bills take to process. Ideally, each grouping of bills has an identical size. Therefore, when multiprocessing the groupings generated by the BPM 504, all of the groupings may finish at approximately the same time, thus reducing the amount of wasted time. Further, a standard size of grouping may be selected to enable monitoring for problems when a particular grouping takes an inordinate amount of time based on that standard size.

In a preferred embodiment each grouping generated by the BPM 504 maybe processed in about one hour. If each bill takes about 10 seconds to be processed, then each grouping may contain about 360 bills. BPM 504 may also contain artificial intelligence components which monitor processing rates of the bills to determine how many bills may be processed in one hour and may then distribute more or fewer bills as determined.

For illustration consider a node system covering a region depicted in FIG. 6. In the region covered by this node system are six distinct FTAs, each having a different number of customers. Suppose FTA1 has 700 customers, FTA2 has 1000 customers, FTA3 has 360 customers, FTA4 has 360 customers, FTA5 has 720 customers and FTA6 has 1440 customers. Suppose also that the node system has only a single billing cycle. The BPM 504 assigned to this node system would first distribute the total 4580 bills to be generated into the six FTAs according to the geographic distribution of the customers for whom the bill is being generated.

The BPM 504 then determines that several of the groupings have more than 360 bills to be produced and thus would likely take longer than an hour to process. Therefore, BPM 504 would break each of these groups into 360 bills or fewer. The table below depicts an example of the groups that the BPM 504 would generate for this node system.

| Grouping No. | No. of Custs. | FTA |
| --- | --- | --- |
| 1 | 360 | 1 |
| 2 | 340 | 1 |
| 3 | 360 | 2 |
| 4 | 360 | 2 |
| 5 | 280 | 2 |

-continued

| Grouping No. | No. of Custs. | FTA |
| --- | --- | --- |
| 6 | 360 | 3 |
| 7 | 360 | 4 |
| 8 | 360 | 5 |
| 9 | 360 | 5 |
| 10 | 360 | 6 |
| 11 | 360 | 6 |
| 12 | 360 | 6 |
| 13 | 360 | 6 |

Once BPM 504 has distributed the bills into the various groupings, a processing group file is generated containing each customer bill record to be processed as determined by the distribution by BPM 504. BPM 504 then spawns a BPW process 506 for each of the processing group files and assigns the BPW 506 to process each customer bill record in that processing group file. BPWs 506 are then initiated on a multi-processing environment in which each of the BPW's may be processed simultaneously. Often, however, more BPWs may be generated by a BPM than the available number of processing slots.

For example, in a preferred embodiment, the BPW's may be processed on eight UNIX processors. Further, each UNIX processor may processes two jobs in parallel. Therefore, sixteen BPW's may be processed simultaneously in parallel. If BPM 504 has generated more BPW's than there are processors, then BPM 504 assigns the first number of BPW's to one of the processors. BPM 504 then monitors the processors and as soon as one of the BPW's completes on one of the processors, BPM 504 assigns another BPW 506 to that processor. This process continues until every BPW 506 generated by BPM 504 has been assigned to a processor and completed.

Once a BPW 506 and the post-production activities associated with the BPW have been completed, BPW 504 may also be responsible for transmitting processed bills to bill renderer 22 for bill rendering, printing, and shipment. Alternatively, BPM 504 may simply notify system 10 which may cooperate with another component to effectuate this purpose. Alternatively, a hard copy of the bills may be generated and mailed to bill renderer 22.

Bill Production Worker (BPW 506)

Although in this description multiple BPW 506 processes are initiated to process these cycles transactions and accounts, alternatively, a single BPW 506 may be initiated such that processing does not occur in parallel. The work performed by each of the BPW 506 processes in the preferred embodiment with multiple BPW 506 processes is the same.

Each BPW process 506 processes each of the customer bill records provided to it in the processing group file in order. To process each bill, BPW 506 preferably completes multiple phases. In a preferred embodiment each of these phases exploits its own library of routines, procedures, and tools. In this way, each phase may be separately performed if particular phases are determined to be unnecessary or if time constraints prevent the full BPW 506 process from being executed. Further, in a preferred embodiment, a data field (or bit pattern) containing a start flag (or bit) and a stop flag (or bit) for each of the phases is associated with each of the bills. For example, for a BPW process having eight phases, each bill may have a sixteen bit data field associated therewith. Before a particular customer for which bill is to be generated is processed, all of the flags are off (or equal to 0). When the customer bill record begins processing. BPW 506 begins the first phase and proceeds through each of the phases until that customer's bill has been processed.

When a phase is initiated for the customer, the start flag associated with that phase may be turned on (turned from a zero to a one). Likewise, when the phase is completed, the stop flag associated with that phase may be turned on. In this manner, BPW 506 can determine which phases of the customer bill records have been started and which ones have been completed. Therefore, if a system crash happens to occur, BPW 506 can easily reconstruct what processing has been performed and also determine which bills need to be reprocessed. For example, BPW 506 may scan the customers in the file it is responsible for processing until it finds a customer having a zero in its data field.

Figure 7:
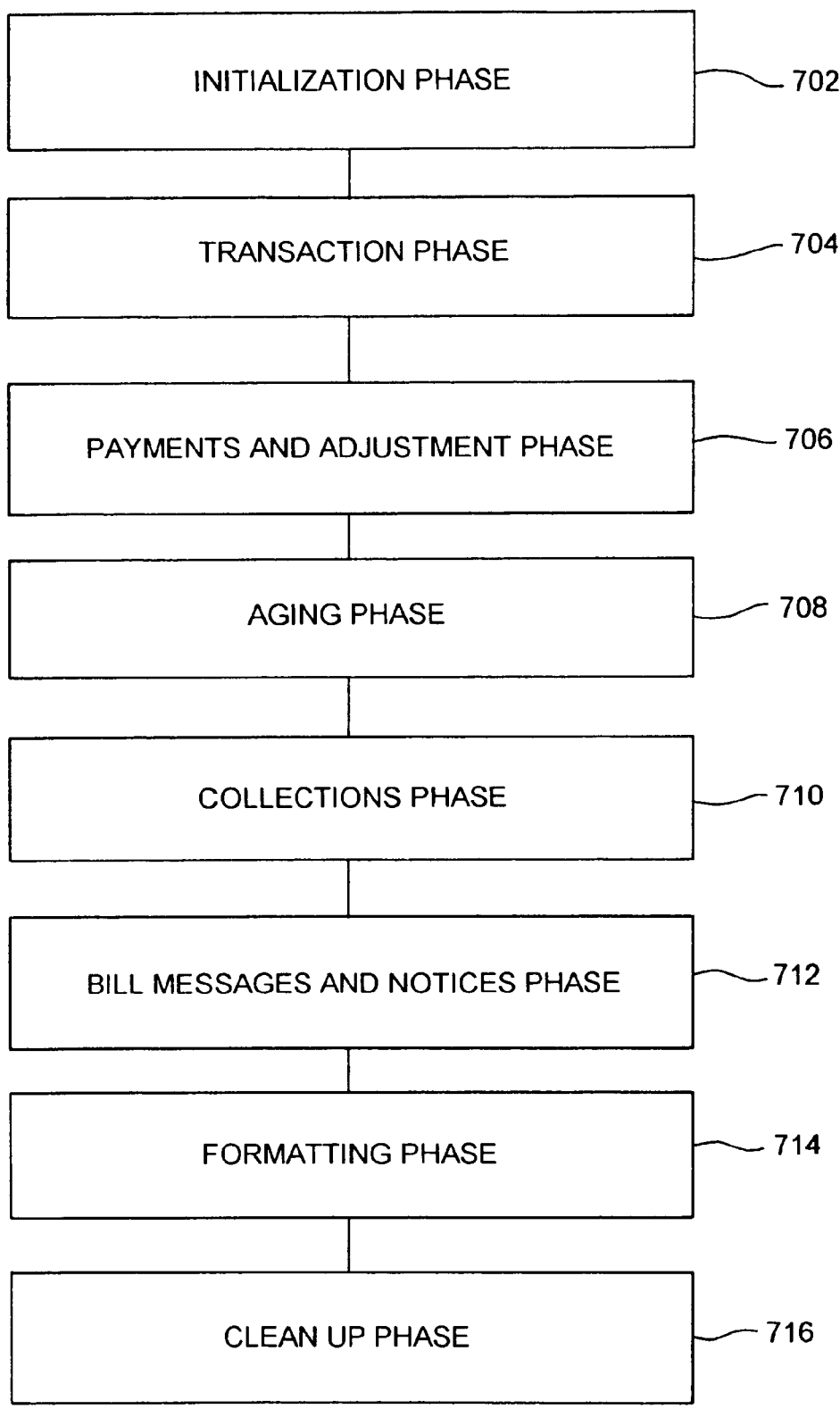
FIG. 7 depicts a flow chart of a bill processing sequence according to one embodiment of the present invention.

The following discussion provides detail regarding each of the phases performed by BPW 506 process according to a preferred embodiment of the present invention. As depicted in FIG. 7, the BPW process may comprise an initialization phase 702, a transaction phase 704, a payments and adjustments phase 706, an aging phase 708, a collections phase 710, a bill messages and notices phase 712, a formatting phase 714, and a cleanup phase 716.

The first phase of the BPW process 506 is the initialization phase 702. Initialization phase 702 basically initializes data for the customer's billing run. For example, it establishes data which is to be used by the other phases in processing the customer's bill. For example, it may determine the current balance for the customer prior to the bill generation, the date of the bill run, the time range for the billing cycle including the beginning date and the end date, the begin date and end date for payments to be due, etc.

The second phase of the BPW process 506 is the transaction phase 704. Transaction phase 704 determines which products the customer has and builds a transaction for each of those products so that these products will be included on the bill. For example, if a customer-has HBO, Cinemax, Showtime and has subscribed to two pay-per-view events, the transaction phase builds a transaction for all five of these products to be displayed on the bill. If any of these products has been discontinued, those products are moved by the transaction phase into the history table in the database on DAS 104 so that the products will not be displayed on any future bills. The term building a transaction comprises gathering transaction objects to be displayed on a bill. The term gather generally refers to the process of accessing information maintained on the database for the customer in DAS 104. Transaction objects may comprise products, taxes, payments, or any entry which may alter the amount due on a customer's bill. Thus, the transactions described refer to the generic gathering of information with an associated semantic meaning and a monetary value associated with that semantic meaning. For example, for HBO, the transaction object may contain a semantic meaning of "HBO" to appear on the customer bill and a monetary value of $6.00, for example. These objects are gathered for further bill production as described below.

After the transactions phase 704, the payments and adjustments phase 706 similarly gathers all payments or adjustments or any other financial item that has happened to an account since the last time the bill has been generated for the particular customer. Payments may include credit card payments, check payments, or other standard adjustments, for example. Typically all of the objects gathered in this phase comprise the items which affect the balance of the account but are not classified as products.

Then the BPW 506 processes the aging phase 708. Aging phase 708 prioritizes debts into age categories or buckets. Typically age buckets comprise 30 days. Aging phase 708 takes the previous debts of the customer and moves them down into the next age bucket. For example, it moves all of the current debts into the 30 day age bucket, all of the debts more than 30 days old into the 60 day age bucket, all of the debts more than 60 days old into the 90 day age bucket, etc. Any new money received on the account may then be applied to the oldest debt.

The aging phase 708 also determines the current balance by totaling the amounts due from all of the age buckets. The use of the age buckets enable the system to more easily reconstruct amounts due when a reversal of payment is required. A more detailed description of the aging process is provided in a co-pending and co-assigned patent application entitled "Method and System For Reversal of Billing Transactions" having Attorney Docket No.018972.0295 and filed on Dec. 29, 1995.

Once the aging phase 708 is complete, the collections phase 710 is initiated by the BPW 506. The collections phase 710 determines, based upon the amount of money in the various age buckets, whether a customer should be in collections or not based upon the newly determined balance. The collections phase 710 may review the amount of money due in each of the age buckets and may assign the customer to a category based on the current ballance and payment history of the account. These categories may be determined by the system and updated in the database maintained at DAS 104. In a preferred embodiment, OPS 80 comprises a collections component and collections phase 710 serves as a gateway to initiate activities by the collections component.

After the collections phase 710 has completed, BPW 506 initiates the bill messages and notices phase 712. Bill messages and notices phase 712 takes the information from the collections phase and determines if any information is to be placed on the bill to notify the customer of the status of the account. Also, bill messaging and notice phase 712 may access a messages database on DAS 104 for the products of the particular customer. For example, a message may be placed in the messages database for all customers who subscribe to HBO to receive a message regarding subscribing to Starz also. The bill messages and notices phase 712 builds a list of messages for the customer regardless of the amount of space available on that customer's bill. Further, each message may have an associated priority and the bill messages and notices phase 712 builds the list based on priority.

The next phase is the formatting phase 714. Formatting phase 714 is responsible for gathering all of the generated information and placing that information onto a screen representative of the bill the customer is to receive. Essentially formatting phase 714 lays out the bill, including the messages listed by bill messages and notices phase 712, by priority such that the highest priority message is printed first. Formatting phase 714 gathers the text and monetary value associated with each of the objects which have been gathered for this bill. In a preferred embodiment, the output from the formatting phase 714 is in a file containing bill renderer 22 language such that the result of this phase may be passed directly to the bill renderer 22.

The last phase is the clean up phase 716. Clean up phase 716 is responsible for cleaning up the data associated with the current customer's bill such that the next customers bill may be started.

Post-Production

Although termed as post-production activities, in a preferred embodiment each of these activities is performed by the BPW prior to completion. In this manner, these activities occur as part of the BPW process itself, requiring completion prior to BPW processing 506 being considered completed. Alternatively, the post production activities may be separately processed following BPW processing 506 but prior to actual bill rendering. For example, these post-production activities may be manually initiated by an individual monitoring the bill generation process and collecting data into files on which the post-production activities may be performed.

Post production activities may include, for example, storing a copy of a bill image as generated by each BPW 506 in the database for later access by a CSR on-screen in case a customer wishes to discuss an old or newly generated bill. In this step, each bill file is essentially scanned and the BPW 506 extracts the data for the bill image and generates an image of the bill as it will be produced by the bill renderer. This image may then be stored on DAS's 104. Counting of objects in the image and breaking the objects into pages may also be performed prior to storing the image in the database. Thus an archive database of customer bills is maintained within the system for some period of time so that images may be called up wherein the images match the hard copies generated and mailed by the bill renderer.

Another post production activity may comprise preparing the bill run for transmission to bill renderer 22. For example, a header file may be created indicating such things as the number of bills following the header for the particular run, special fonts that are to be accessed during printing of the subsequent bills, inserts that are to be included during preparation of the subsequent bills or special images that are to be accessed during the printing of the subsequent bills. Basically, the file header has all of the information for the bill renderer 22 to generate bills for that file. Once this is done, the header file and the data associated with it are sent over the network to bill renderer 22 for processing. Then the BPW 506 is complete and releases the processor such that BPM 504 may initiate another BPW 506 on that processor.

Although the present invention and its advantages have been described in detail, it should be understood that various changes, substitutions, and alterations can be made therein without departing from the spirit and scope of the invention as defined by the appended claims.

What is claimed is:

1. A method of processing customer bills for a plurality of customers associated with a plurality of node systems, each customer bill having a billing cycle, the method comprising the steps of:
   distributing the customer bill records to be processed into node groups based upon the node systems associated with the customers;
   dividing the node groups into one or more sub-node groups, wherein the customer bill records distributed into each sub-node group share at least one common variable;
   dividing the sub-node groups into processing groups, wherein the number of customer bill records distributed into each processing group is predetermined; and
   processing the customer bills distributed into each processing group wherein at least two of the processing groups are processed in parallel.

2. The method of claim 1, wherein the customer bills are distributed into the sub-node groups based on franchise tax areas.

3. The method of claim 1 comprising the step of monitoring the processing of a processing group and upon completion of the processing of a processing group, initiating processing of another processing group.

4. The method of claim 1, wherein the step of processing the customer bills includes multiple phases.

5. The method of claim 4 comprising the step of indicating the initiation and completion of each of the phases of the processing step.

6. The method of claim 5 comprising the step of determining a point for restarting processing upon a failure to complete processing.

7. The method of claim 4, wherein the processing phases include:
   initiating the customer bill;
   gathering product transactions for the customer bill;
   gathering non-product transactions for the customer bill;
   aging account information for the customer bill;
   determining a collections status for the customer bill;
   gathering messages for the customer bill; and
   formatting the customer bill.

8. The method of claim 1, further comprising:
   monitoring a current time for determining customer bill records to be processed; and
   gathering the customer bill records to be processed, wherein the step of gathering customer bill records to be processed includes gathering customer bill records which have a billing cycle start time greater than the current time.

9. A computer system for processing bills for a plurality of customers associated with a plurality of node systems, each customer bill having a billing cycle, the system comprising:
   means for distributing the customer bill records to be processed into node groups based upon the node systems associated with the customers;
   means for dividing the node groups into one or more sub-node groups, wherein the customer bill records distributed into each sub-node group share at least one common variable;
   means for dividing the sub-node groups into processing groups, wherein the number of customer bill records distributed into each processing group is predetermined; and
   means for processing the customer bills distributed into each processing group wherein at least two of the processing groups are processed in parallel.

10. The computer system of claim 9, wherein the customer bill records distributed into the sub-node groups share a common franchise tax area.

11. The computer system of claim 9, wherein the means for processing inludes a plurality of processors processing at least two of the processing groups in parallel.

12. The computer system of claim 11 comprising:
   means for monitoring at least one of the processors to detect the completion of the processing of the customer bills of a processing group; and
   means for initiating processing of another processing group on the at least one processor.

13. The computer system of claim 9 comprising means for reprocessing a customer bill record which was not completed prior to a failure.

14. A computer system for processing bills for a plurality of customers associated with a plurality of node systems, each customer bill having a billing cycle, the system comprising:
   a memory for storing a plurality of customer bill records;
   a bill production initiator for initiating a billing cycle for a plurality of the customer bill records stored in the memory;

at least one bill production manager for generating a plurality of processing group files containing at least one of the customer bill records stored in the memory such that each processing group file contains customer bill records having at least one common variable; and at least two bill production workers for processing in parallel the customer bill records of at least two processing group files, wherein the number of customer bill records distributed in each processing group is predetermined.

15. The computer system of claim 14, wherein the bill production initiator includes:

means for monitoring a current time; and means for initiating processing for customer bill records having a billing cycle start time greater than the current time.

16. The computer system of claim 14, wherein the bill production manager includes means for distributing the customer bill records into processing group files based upon the node systems associated with the customers.

17. The computer system of claim 14, wherein the bill production manager includes means for distributing the customer bill record into processing group files based on the geographical locations of the customers.

18. The computer system of claim 14, wherein the bill production manager includes means for distributing a predetermined number of the customer bill records into each processing group file.

19. The computer system of claim 18, wherein the predetermined number of the customer bill records is equal to the number of customer bill records which may be processed in a predetermined amount of time.

20. The computer system of claim 19, wherein the predetermined amount of time is approximately one hour.

21. The computer system of claim 14, wherein the bill production manager comprises means for distributing the customer bill records into processing group files based on franchise tax areas in which the customers are located.

* * * * *